UNITED STATES PATENT OFFICE.

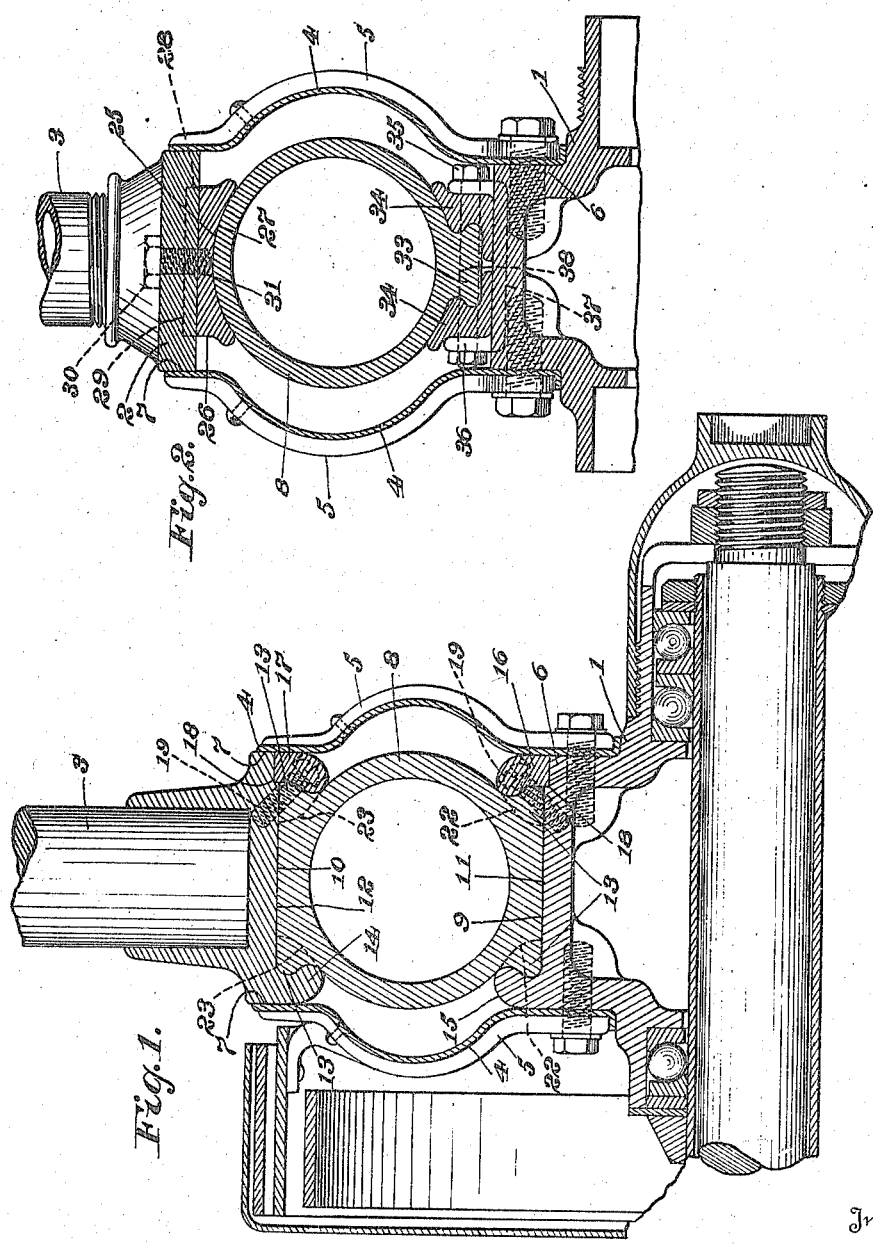

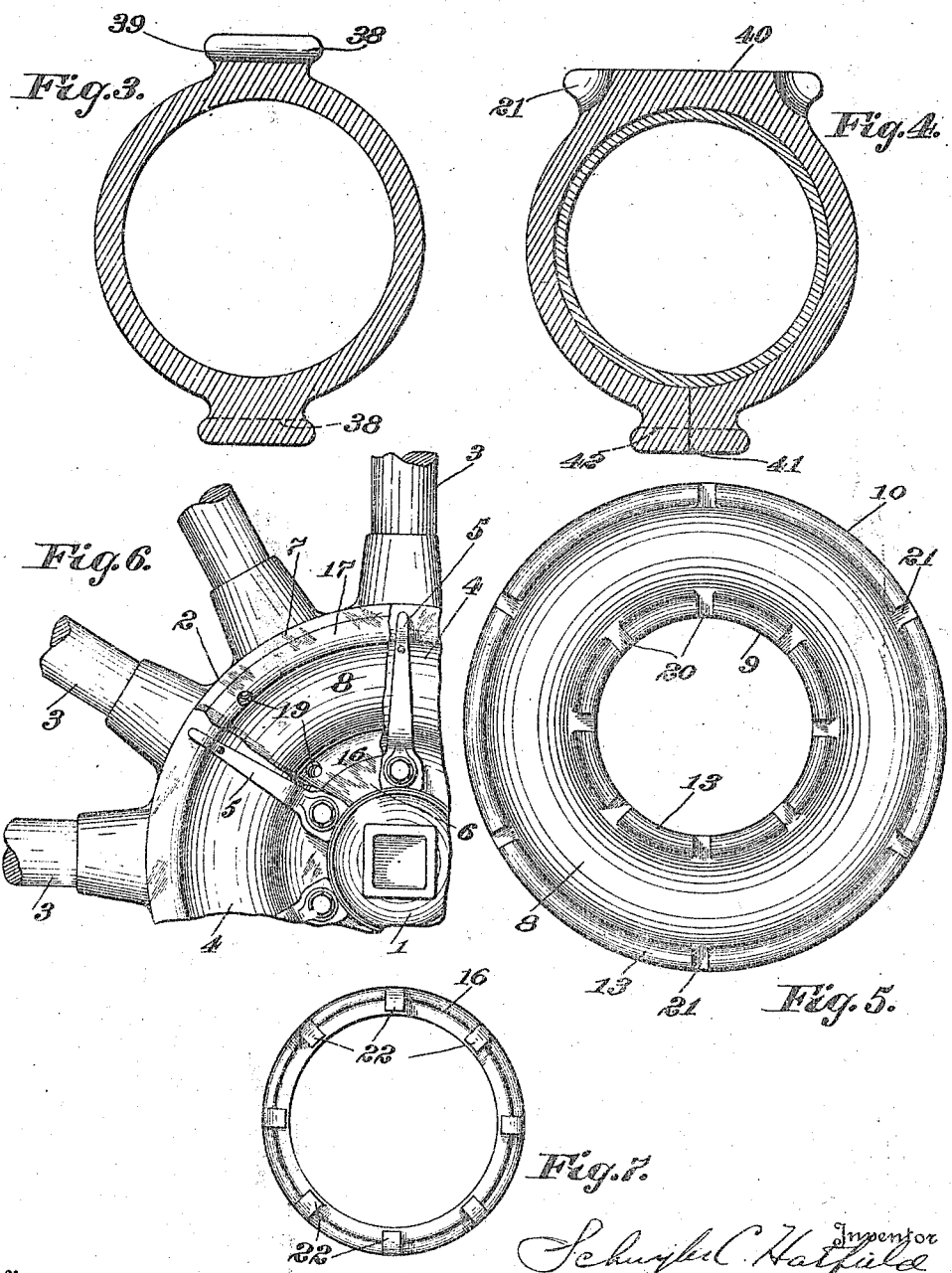

SCHUYLER C. HATFIELD, OF BALTIMORE, MARYLAND.

ELASTIC WHEEL.

1,286,307.　　　Specification of Letters Patent.　　Patented Dec. 3, 1918.

Application filed January 11, 1916. Serial No. 71,408.

*To all whom it may concern:*

Be it known that I, SCHUYLER C. HATFIELD, a citizen of the United States of America, residing in the city of Baltimore, State of Maryland, have invented certain new and useful Improvements in Elastic Wheels, of which the following is a specification.

This invention relates to an elastic wheel of the general type described in my prior Patents Nos. 1,105,654 and 1,087,903, and particularly to the pneumatic pad which forms the elastic element in the wheel described in these patents and the details of the pad wherein it combines with and engages the rigid portions of the wheel; also the details of such rigid parts of the wheel as have as their function the transmission to the pad of the stresses to which the wheel is subject and the holding of the pad in position.

In the accompanying drawing, I have shown a pneumatic pad together with so much of an elastic wheel with which the pad is combined as is necessary to a full comprehension of the device of my invention.

In the drawings, Figure 1 is a fragmentary, transverse section of a wheel taken on a radial plane, showing the manner of application of the annular, pneumatic pad or tire, according to the preferred form of the invention;

Fig. 2 is a similar section showing a slightly different form;

Figs. 3 and 4 are similar views of the pad with still other variations;

Fig. 5 is a side elevation of a pad of the type shown in Fig. 1;

Fig. 6 is a fragmentary elevation showing the central portion of the wheel, and manner of applying the annular pad; and Fig. 7 is an elevation, looking outward at the inner face of either one of the locking rings for holding the pad in position; this relates to the structure shown in Fig. 1.

Referring to the drawings by numerals, the portion of wheel structure shown includes a hub portion 1, an inner rim 2, spokes 3, guide plates 4 and guide arms 5 secured to a circumferential rib 6 on the hub and engaging flat guide surfaces 7 on the inner rim 2, permitting relative motion of the hub and inner rim but confining this motion to a radial plane. Mounted between the hub 1 and the inner rim 2 is the annular pneumatic pad 8, and in the preferred form of the invention, shown in Fig. 1, the rigid portion of the wheel and the pad are combined in the following manner: The pad, or tire, has inner and outer flat surfaces 9 and 10 of a width almost equal to the diameter of the tube. These inner and outer flat surfaces 9 and 10 on the tire engage corresponding outer and inner flat surfaces 11 and 12 on the hub and inner rim 2 respectively. As it is of course not desirable to reduce the thickness of any portion of the tube, the flat surfaces 9 and 10 make it necessary to build up or increase the thickness of the tube to form the edge portions of these flat surfaces. In this way, four beads or rims 13, one at each edge of each flat surface, are formed and these beads or ribs are utilized to hold the pad in position.

In the form of the invention shown in Fig. 1, the inner edge of the rim 2 and of the rib 6 on the hub are formed each with a corresponding bead 14 and 15 to take over and inclose the bead 13 on the tire, the inner edge referred to as the location of the integral ribs 14 and 15, being the edge adjacent the body of the vehicle. The tire is held at the outer edge by beads corresponding to those numbered 14 and 15, but in order that the tire may be conveniently replaced in the infrequent instances in which it becomes worn or flattened, these beads are made in the form of inner and outer removable rings 16 and 17 secured to the outer edge of the circumferential rib 6 of the hub and the inner rim 2, respectively. In the present instance, each of these members as shown, is rabbeted at 18 to provide a seat for the corresponding ring 16 or 17 and the rings are held in position by inclined screws 19.

In some instances, the friction set up by inflating the pad has been depended upon to hold the parts in their assembled relation and to transmit the tractive force to the vehicle, but it has been found that the inflation of the tire, while it actually increases the friction between the inner rim and the outer circumference of the tire, does not always set up sufficient friction between the hub and the inner surface of the tire to accomplish this result. In the present instance, this difficulty has been overcome by notching the inner and outer beads 13 at intervals, as indicated at 20 and 21 respectively in Fig. 5, and providing the integral beads 14 and 15 on the inner rim and hub, and the rings 16 and 17 with corresponding lugs 22 and 23 on the inner ring 16 and the outer ring 17 respectively, and as the friction set up when the tire is inflated is greater at the outer than the inner circumference, these notches 20 and 21 and coöperating lugs 22 and 23 are preferably placed at shorter intervals and made more numerous at the inner than at the outer circumference of the tire. In Fig. 2, I have shown a wheel having a pad with the outer surface, corresponding to the tread of the usual tire, of circular cross-section. This surface or tread, which is of the same thickness as the remainder of the tube, is indicated by reference character 25.

To receive the tire and transmit the rim pressure to the tire, the inner rim 2 is in this instance provided with a removable seating ring or band 26 having a curved or dished inner, annular surface 27 to receive the tire. This ring 26 is provided with lugs 28 arranged at intervals parallel to the axis to engage corresponding recesses 29 in the inner face of the inner rim. The ring 26 is held in position against lateral motion by any convenient means as cap screws 30 passing through the rim 2 in a radial direction and engaging suitable cups 31 in the outer periphery of the band 26. The inner periphery of the tire or pad, as shown, is provided with a bead 33 engaged by locking rings 34 clamped together by screws 35 passing through holes parallel to the axis and U-shaped clamps 36 through which the bolts 35 may also pass, the clamps 36 being preferably seated in grooves 37 in the periphery of the hub. The rings 34 are held against displacement in the direction of the axis by the bearing of the guide plates 4 on the ends of the bolts 35. The bolts 35 pass through the grooves or notches 38 in the bead 33 and these notches with the bolts serve to hold the tire in position on the hub and prevent rotation of the tire and the outer section of the wheel relatively to the hub. As has been pointed out, the frictional resistance here is slight as compared with that offered at the outer periphery of the pad. With the type under discussion, frictional contact of the pad with the band 26 is believed to be sufficient to prevent slipping at this point.

In Fig. 3, I have shown a pad having a bead 39 with notches 38 in both the inner and outer periphery. This is substantially like the bead 33 and intended to be seated and held in position in like manner with seating rings corresponding to the rings 34.

In Fig. 4, I have shown a pad with a flat outer peripheral surface 40 like that marked 10 in Fig. 1 and with an inner peripheral bead 41 having notches 42 like those marked 38 in Fig. 2 to receive clamping bolts corresponding to those indicated by reference character 35 in that figure.

The general function and operation of the elastic wheel of the invention is believed to be well understood from this description and the previous patents cited herein. The present invention, as more particularly pointed out in the claims, is intended to cover the pad and the manner of securing it against lateral and rotary movement relative to the wheel structure. As to the different types, the flat surfaces 10, 11 and 40 bearing against the hub and inner rim surfaces are intended particularly for work with heavy loads to increase the bearing power of the pad and the lateral resistance presented by the structure, economize space and thus shorten the guide plates 4 and guide arms 5 and reduce the leverage and therefore the stress to which these plates and arms are subjected. The forms shown in Figs. 2 and 3, being more resilient and less rigid laterally, are particularly adapted for use on lighter vehicles. The forms illustrated in Figs. 1, 3, 4 and 5 have the particular advantage that both the inner and outer periphery of the pad are secured to the wheel, one to the hub and the other to the outer section of the wheel, in such a manner that the connection of the pad to the wheel section is not released even when the tire is deflated so that the torque which is always transmitted through the pad is not lost when the pad is deflated and also the support of the pad is retained by suspension of the hub from the portion of the outer section directly over it instead of by compression of the pad between the lower part of the hub and the portion of the inner rim directly beneath it.

I have thus described my invention specifically and in detail in order that its nature and operation may be fully understood; however, the specific terms herein are used descriptively rather than in their limiting sense and the scope of the invention is defined in the claims.

I claim:

1. In an elastic wheel in combination, an outer section with an inner rim, means for guiding the parts so that the hub and outer section move relatively only in a radial plane, a pneumatic pad between the inner rim and the hub section, a flat bead with overhanging edges encircling the outer periphery of the pad, a similar bead encircling the inner periphery of the pad, the overhanging edges of each bead being notched, the wheel sections having corresponding beads taking over the edges, the beads having teeth to engage the notches and one bead on the hub and one bead on the inner rim of the outer section being in the form of a removable ring, and means for securing this removable ring in position to grip the bead and hold the pad in engagement with the corresponding section of the wheel, whether it is inflated or deflated.

2. In an elastic wheel having an outer section with an inner rim and a hub section within the inner rim, the parts being movable relatively in a radial plane, an annular pneumatic pad between the inner rim and the hub section, the pad having a periphery bead with overhanging edges, notches in the overhanging portion, a hooked bead on the wheel to take over the overhanging edge, the bead having teeth to engage the notches in the edge of the bead on the pad, and one portion of the hooked bead being in the form of a removable ring with means for securing it in position and forcing it against the bead on the tire to grip the tire or pad and hold it in engagement with the wheel.

3. In an elastic wheel having an outer section with an inner rim, a hub section within the inner rim, means for guiding the two sections so that they move relatively in a radial plane, an annular pneumatic pad between the sections, the pad having an inner peripheral rib with a projecting bead on each side, the rib being apertured at intervals, means on the hub for inclosing the rib and beads having means at corresponding intervals to engage the apertures, and means for drawing the engaging means together to grip the beads, the inner rim and the outer periphery of the pad being provided with engaging means whereby the torque is transmitted from one wheel section to the other.

Signed by me at Baltimore, Maryland, this 10th day of January, 1916.

SCHUYLER C. HATFIELD.

Witnesses:
ZELLA KUHN,
PORTER H. FLAUTT.

Copies of this patent may be obtained for five cents each, by addressing the "Commissioner of Patents, Washington, D. C."